(12) United States Patent
Lee

(10) Patent No.: US 8,584,528 B2
(45) Date of Patent: Nov. 19, 2013

(54) MANOMETER WITH A PRESSURE TRANSFORMING DEVICE

(76) Inventor: Chia-Hsin Lee, Chiayi (TW)

(*) Notice: Subject to any disclaimer, the term of this patent is extended or adjusted under 35 U.S.C. 154(b) by 217 days.

(21) Appl. No.: 13/277,120

(22) Filed: Oct. 19, 2011

(65) Prior Publication Data
US 2013/0098161 A1 Apr. 25, 2013

(51) Int. Cl.
*G01L 7/16* (2006.01)
(52) U.S. Cl.
USPC ............................................. 73/744; 73/700
(58) Field of Classification Search
USPC .................................................. 73/700–756
See application file for complete search history.

(56) References Cited

U.S. PATENT DOCUMENTS

| | | | | | |
|---|---|---|---|---|---|
| 4,217,784 | A | * | 8/1980 | Neubeck et al. | 73/732 |
| 4,658,644 | A | * | 4/1987 | Coesfeld et al. | 73/146.8 |
| 4,683,756 | A | * | 8/1987 | Derleth et al. | 73/747 |
| 4,965,422 | A | * | 10/1990 | Liu | 200/83 S |
| 6,637,272 | B1 | * | 10/2003 | Bariere | 73/715 |
| 2060/0081060 | | * | 4/2006 | Forster | 73/732 |

* cited by examiner

*Primary Examiner* — Andre Allen
(74) *Attorney, Agent, or Firm* — Kilpatrick Townsend & Stockton LLP

(57) ABSTRACT

A manometer includes a pressure gauge, a cylinder having a larger cross-section and an outlet, and a tubular coupler fluidly communicated with the cylinder and having a source-side port. A piston is fitted in and fluid-tightly slidable relative to the cylinder to define a fluid subchamber in communication with the outlet. A piston rod having a smaller cross-section extends from the piston into the tubular coupler to terminate at a pressed end. The outlet and the source-side port are fluidly communicated with the pressure gauge and a pressure source to be measured so as to transform an internal pressure of the pressure source into a reduced or augmented fluid pressure to be detected by the pressure gauge.

6 Claims, 6 Drawing Sheets

MANOMETER WITH A PRESSURE TRANSFORMING DEVICE

BACKGROUND OF THE INVENTION

1. Field of the Invention

This invention relates to a manometer for measuring an internal pressure of a pressure source to be measured, more particularly to a manometer having a pressure transforming device to reduce or augment an internal pressure of a pressure source to be measured to a fluid pressure measurable by a pressure gauge.

2. Description of the Related Art

Pressure is the force per unit area applied in a direction normal to the surface of an object. A manometer, such as a bourdon pressure gauge, is a pressure measuring instrument, and is generally connected to a pressure source such that the fluid within the pressure source is directly introduced into the manometer to be measured by a pressure gauge. When a pressure measurement of a high pressure fluid is performed, the extremely high pressure may cause damage to the pressure gauge and an indicator associated therewith, thereby disrupting the pressure measurement. Further, if the pressure of a low-pressure or negative-pressure fluid is to be measured, a highly sensitive pressure gauge, which is expensive, is required.

SUMMARY OF THE INVENTION

An object of the present invention is to provide a manometer which has a simple and cost-economic construction, and which can safely and sensitively measure a relatively large scope of fluid pressure in a pressure source.

According to this invention, the manometer includes a pressure gauge having an upfront port, and an indicator disposed to indicate a measured value that corresponds to a detected fluid pressure measured at the upfront port. A cylinder has a cylindrical chamber which extends in a lengthwise direction to terminate at proximate and distal walls. The proximate and distal walls respectively have an outlet disposed in fluid communication with one of the upfront port and a pressure source, and a guiding bore. A piston is configured to be fitted in and fluid-tightly slidable relative to the cylindrical chamber so as to cooperate with the proximate wall to define a fluid subchamber that is in fluid communication with the outlet. A piston rod is disposed to extend from the piston in the lengthwise direction and outwardly of the guiding bore to terminate at a pressed end, and has a cross-section smaller than that of the cylinder chamber A tubular coupler is configured to define a tubular chamber which is configured to extend in the lengthwise direction to terminate at a source-side port that is in fluid communication with the other one of the upfront port and the pressure source, and a cylinder-side hole that is in alignment with the guiding bore to permit the pressed end to be fluid-tightly guided into the tubular chamber. A corresponding one of the fluid subchamber and the tubular chamber is disposed to contain a working fluid such that an internal pressure of the pressure source exerting on a corresponding one of the pressed end and the piston is transmitted to the working fluid through the piston.

The internal pressure of the pressure source can be transformed into a reduced or augmented fluid pressure to be detected by the pressure gauge so as to protect the pressure gauge and the indicator and to enlarge the pressure detecting scope of the pressure gauge.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
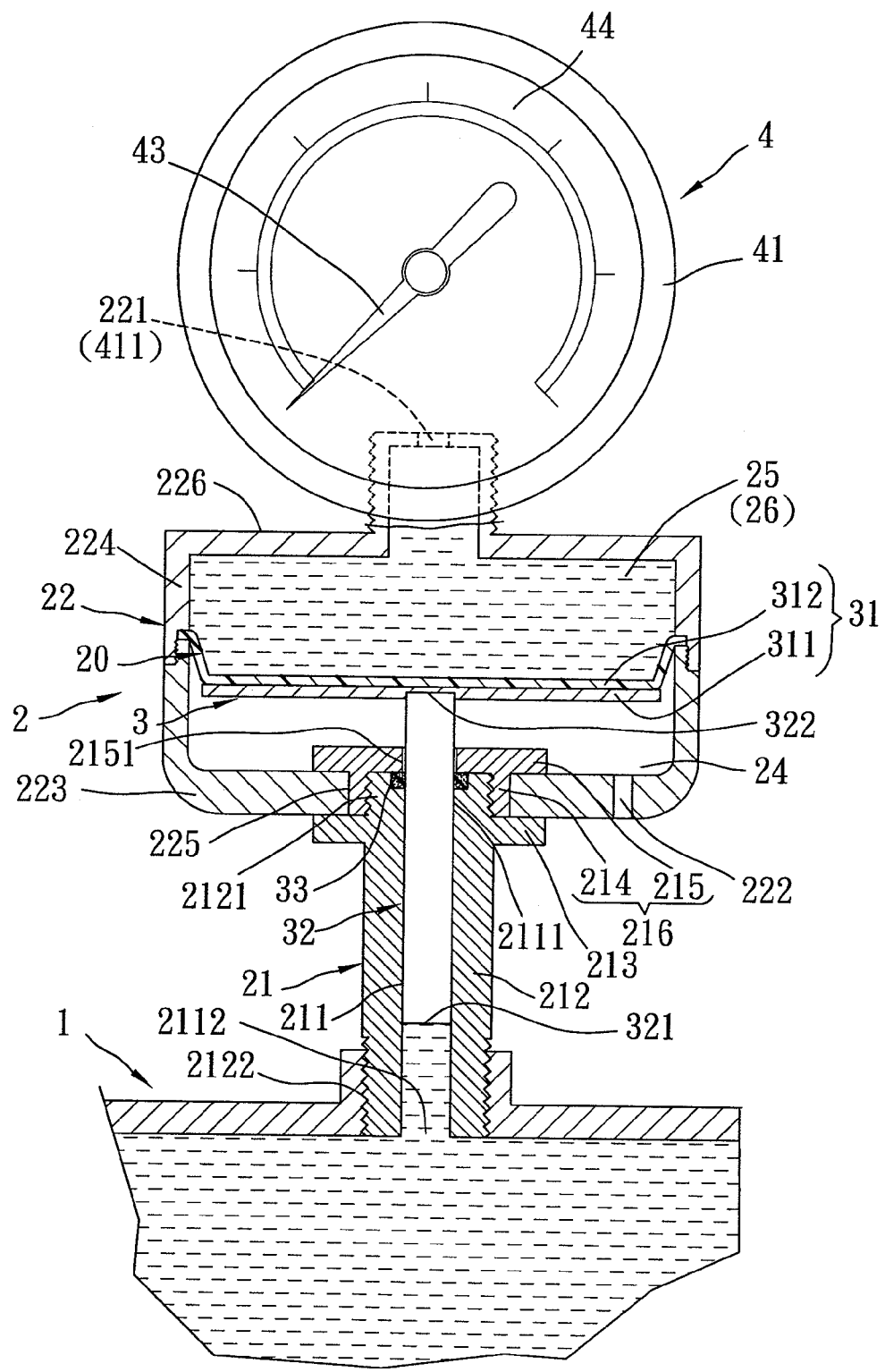
FIG. 1 is a sectional view of the first preferred embodiment of a manometer according to this invention.

Before the present invention is described in greater detail, it should be noted that same reference numerals have been used to denote like elements throughout the specification.

Figure 2:
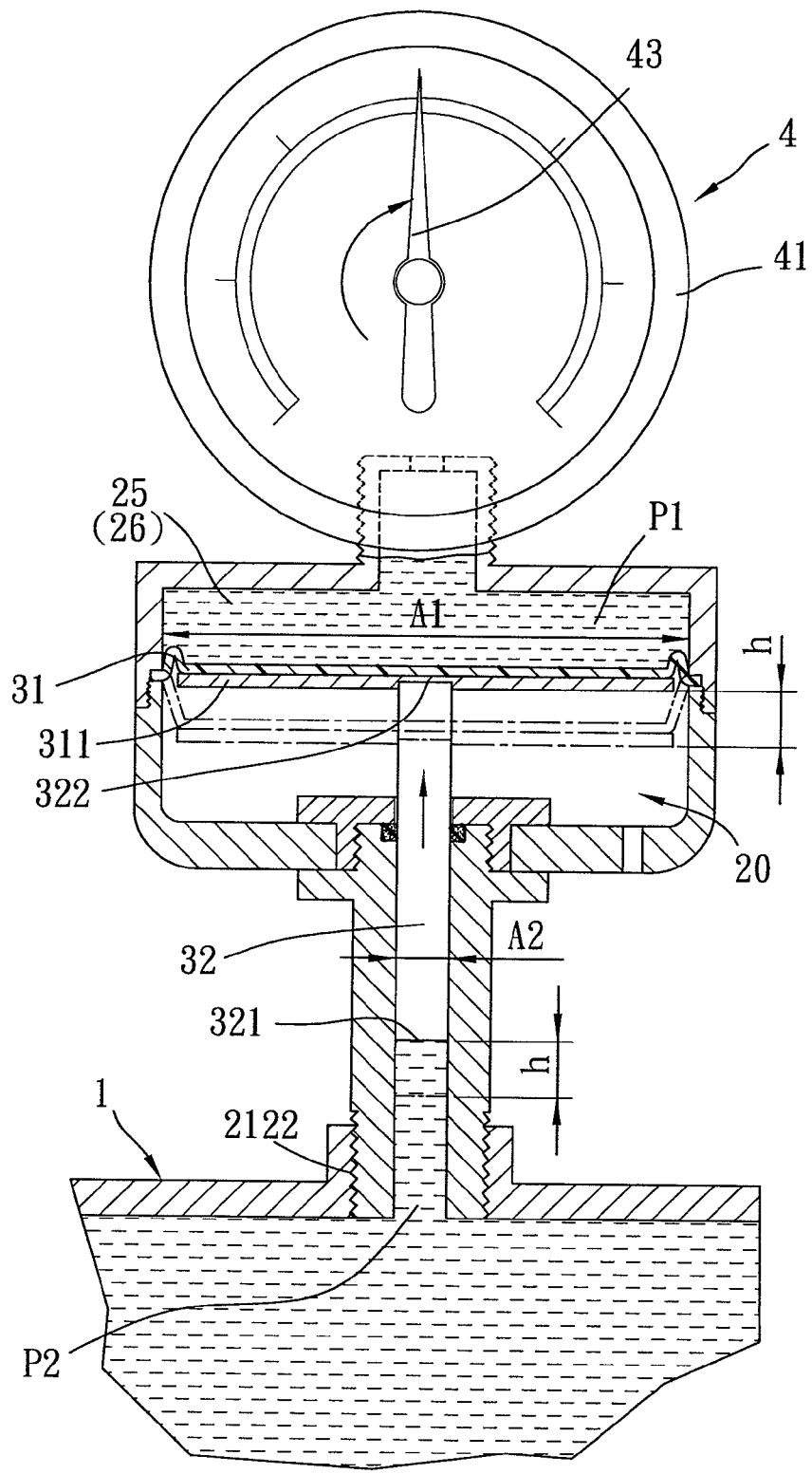
FIG. 2 is a sectional view of the first preferred embodiment for measuring a high internal pressure of a pressure source.

Referring to FIGS. 1 and 2, the first preferred embodiment of a manometer according to the present invention is shown to comprise a pressure gauge device 4 and a pressure transforming device 2.

The pressure gauge device 4 may be an ordinary pressure gauge, such as a gear pressure gauge, a bourdon pressure gauge, a diaphragm pressure gauge, a digital-reading type pressure gauge, etc., and includes a pressure gauge 41 having an upfront port 411, and an indicator 43 disposed to indicate a measured value that corresponds to a detected fluid pressure measured at the upfront port 411.

The pressure transforming device 2 is disposed to couple the pressure gauge device 4 with a pressure source 1 to be measured, and includes a cylinder 22, a piston unit 3, and a tubular coupler 21.

The cylinder 22 includes a proximate wall 226 provided with an outlet 221 which is disposed in fluid communication with the upfront port 411 of the pressure gauge 41, a surrounding wall 224 extending from a periphery of the proximate wall 226 in a lengthwise direction, and a distal wall 223 threadedly engaged with an inner periphery of the surrounding wall 224 so as to define a cylindrical chamber 20. The cylindrical chamber 20 has a cross-section of a first area (A1). The distal wall 223 has a guiding bore 225 aligned with the outlet 221 in the lengthwise direction, and a vent hole 222.

The piston unit 3 includes a piston 31 and a piston rod 32. The piston 31 has a rigid disc 311 and an elastomeric member 312 which is tightly attached to the rigid disc 311 and which is configured to be fitted in and fluid-tightly slidable relative to the cylindrical chamber 20 so as to cooperate with the proximate wall 226 to define a fluid subchamber 25 that is in fluid communication with the outlet 221, and with the distal wall 223 to define an air subchamber 24 in air communication with ambient air through the vent hole 222. In this embodiment, the elastomeric member 312 is in the form of a diaphragm which has a peripheral wall in fluid tight engagement with the inner periphery of the surrounding wall 224 and which is deformable to permit axial movement of the rigid disc 311. The piston rod 32 has a pressing end 322 disposed to press the rigid disc 311, and extends in the lengthwise direction and outwardly of the guiding bore 225 to terminate at a pressed end 321. The piston rod 32 has a cross-section of a second area (A2) which is smaller than the first area (A1) of the cylindrical chamber 20.

The tubular coupler 21 includes a tubular wall 212 which extends in the lengthwise direction to terminate at a cylinder-side threaded end 2121 and a source-side threaded end 2122, and which defines a tubular chamber 211 therein. A surrounding flange 213 extends radially from the tubular wall 212 and adjacent to the cylinder-side threaded end 2121. A tightening nut member 216 has a nut body 214 which is configured to be fitted in the guiding bore 225 and threadedly engageable with the cylinder-side threaded end 2121, and an enlarged head 215 which has a through hole 2151 that is disposed in alignment with the tubular chamber 211 so as to permit the piston rod 32 to pass therethrough. Thus, when the nut body 214 is in full threaded engagement with the cylinder-side threaded end 2121, the enlarged head 215 is brought toward the surrounding flange 213 so as to sandwich and tighten the distal wall 223 therebetween. Additionally, the cylinder 22 is rotatable relative to the tubular coupler 21 so as to facilitate viewing of the indicator 43.

The tubular chamber 211 extends in the lengthwise direction to terminate at a source-side port 2112 which is in fluid communication with the pressure source 1, and a cylinder-side hole 2111 which is in alignment with the through hole 2151 to permit the pressed end 321 of the piston rod 32 to be fluid-tightly guided into the tubular chamber 211. A seal ring 33 is disposed in the cylinder-side hole 2111 and is sleeved on the piston rod 32 to ensure a fluid-tight engagement between the piston rod 32 and the cylinder-side hole 2111.

Referring to FIG. 2, when the manometer of this embodiment is used to measure a high internal pressure of a pressure source 1, the source-side threaded end 2122 of the tubular coupler 21 is connected to the pressure source 1, and the fluid subchamber 25 contains a working fluid 26. The internal pressure (P2) exerting on the pressed end 321 of the piston rod 32 makes movement of the piston unit 3 toward the cylindrical chamber 20 by a distance (h) such that the working fluid 26 is pressed to have a fluid pressure (P1) that is detected by the pressure gauge 41. The detected fluid pressure can be indicated by the indicator 43.

Since the following relationship is obtained: $P1=P2 \times A2/A1$, and since $A1>A2$, the detected fluid pressure (P1) can be reduced by means of transmission of the internal pressure (P2) by the piston unit 3. Therefore, the pressure (i.e., the detected fluid pressure) exerting on the pressure gauge 41 and the indicator 43 is reduced to prevent damage to the manometer. In addition, the pressure gauge device 4 may have a dial plate 44 with a scale made based on the value of A1/A2.

For example, if, when $A1=100 \text{ cm}^2$, $A2=1 \text{ cm}^2$, the internal pressure $P2=1000 \text{ Kg/cm}^2$, then the pressure (the detected fluid pressure P1) exerting on the pressure gauge device 4 is $10 \text{ Kg/cm}^2$, which is much smaller than the internal pressure P2.

Moreover, in this embodiment, in case an abrupt fall in pressure of the pressure source 1 occurs, such as a tube breaking, a sudden displacement of the piston rod 32 toward the source-side port 2112 would not cause the piston 31 to be pulled toward the source-side port 2112 since the piston 31 is detachably mounted on the pressing end 322 of the piston rod 32. Thus, the pressure gauge device 4 is further protected against damage.

Figure 3:
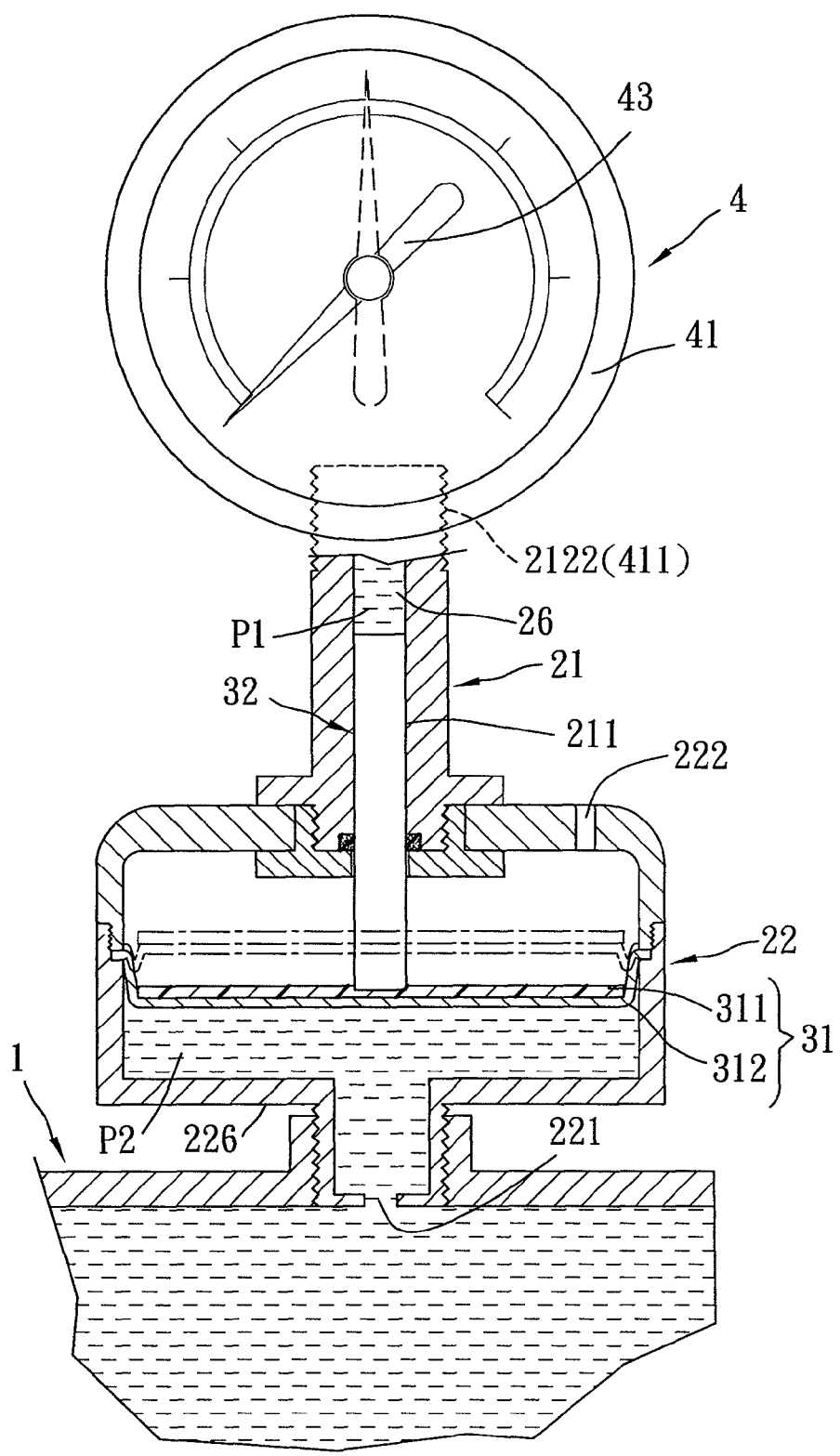
FIG. 3 is a sectional view of the first preferred embodiment for measuring a low internal pressure of a pressure source.

Furthermore, referring to FIG. 3, when the manometer is used to measure a low pressure of a pressure source 1, the outlet 221 of the cylinder 22 may be connected with the pressure source 1, and the source-side threaded end 2122 of the tubular coupler 21 is connected with the upfront port 411 of the pressure gauge 41. A working fluid 26 is contained in the tubular chamber 211 in fluid communication with the upfront port 411. Hence, the internal pressure (P2) of the pressure source 1 may be transmitted to the working fluid 26 so as to result in an augmented fluid pressure (P1), which is more readily measurable by the pressure gauge device 4.

Figure 4:
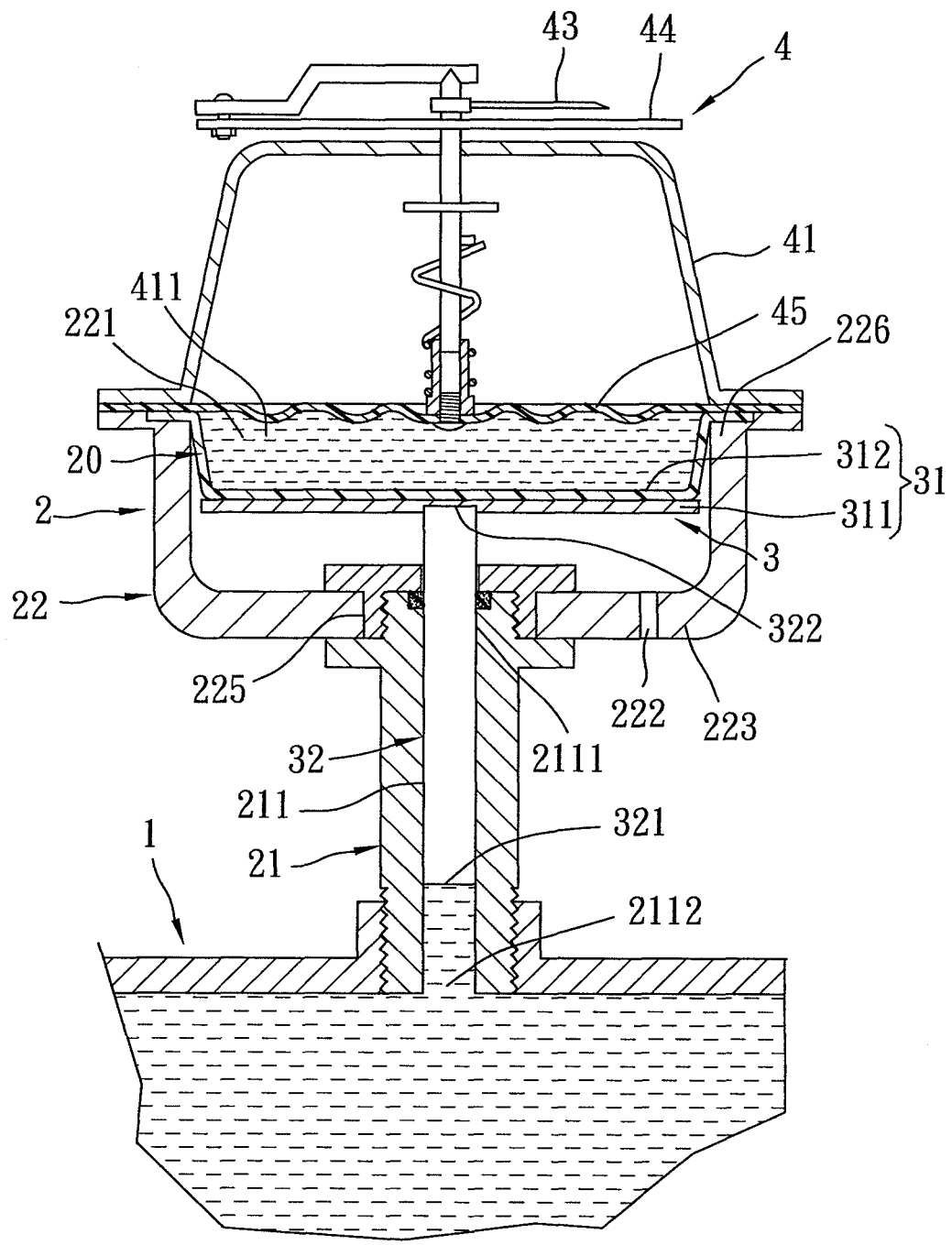
FIG. 4 is a sectional view of the second preferred embodiment of a manometer according to this invention.

Referring to FIG. 4, the second embodiment of the manometer according to this invention is similar to the first embodiment, except that the pressure gauge device 4 is a diaphragm pressure gauge. An axial movement of a diaphragm 45 is translated into an angular movement of the indicator 43 relative to the dial plate 44 so as to indicate the detected fluid pressure.

Figure 5:
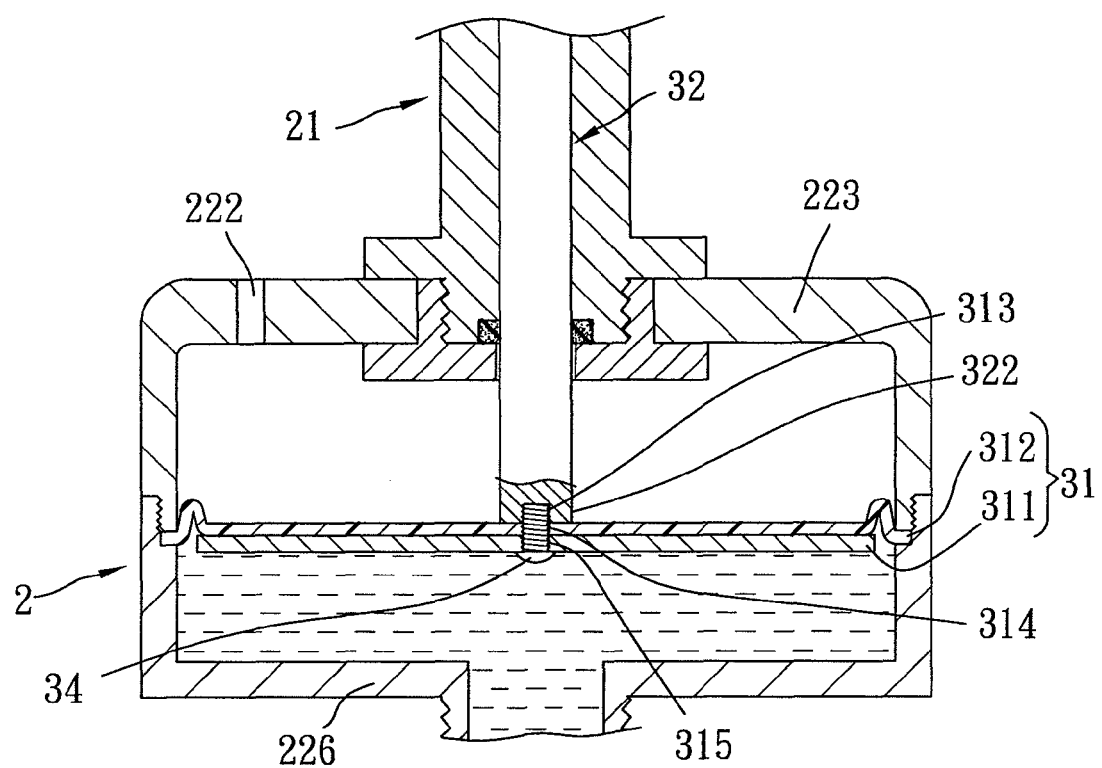
FIG. 5 is a fragmentary sectional view of the third preferred embodiment of a manometer according to this invention.

Referring to FIG. 5, the third embodiment of the manometer according to this invention is similar to the first embodiment, except that the pressing end 322 of the piston rod 32 is securely connected to the piston 31 such that the manometer of this embodiment may be used to measure a pressure source with negative pressure, such as 76 cm Hg in maximum that is slightly larger than $1 \text{ kg/cm}^2$. Specifically, a screw fastener 34 is inserted through central holes 315, 314 in the rigid disc 311 and the elastomeric member 312 to threadedly engage a screw hole 313 in the pressing end 322. When a pressure source with negative pressure is connected with and measured by the manometer of this embodiment, the piston 31 is moved toward the pressure source so as to pull the piston rod 32 toward the proximate wall 226.

Figure 6:
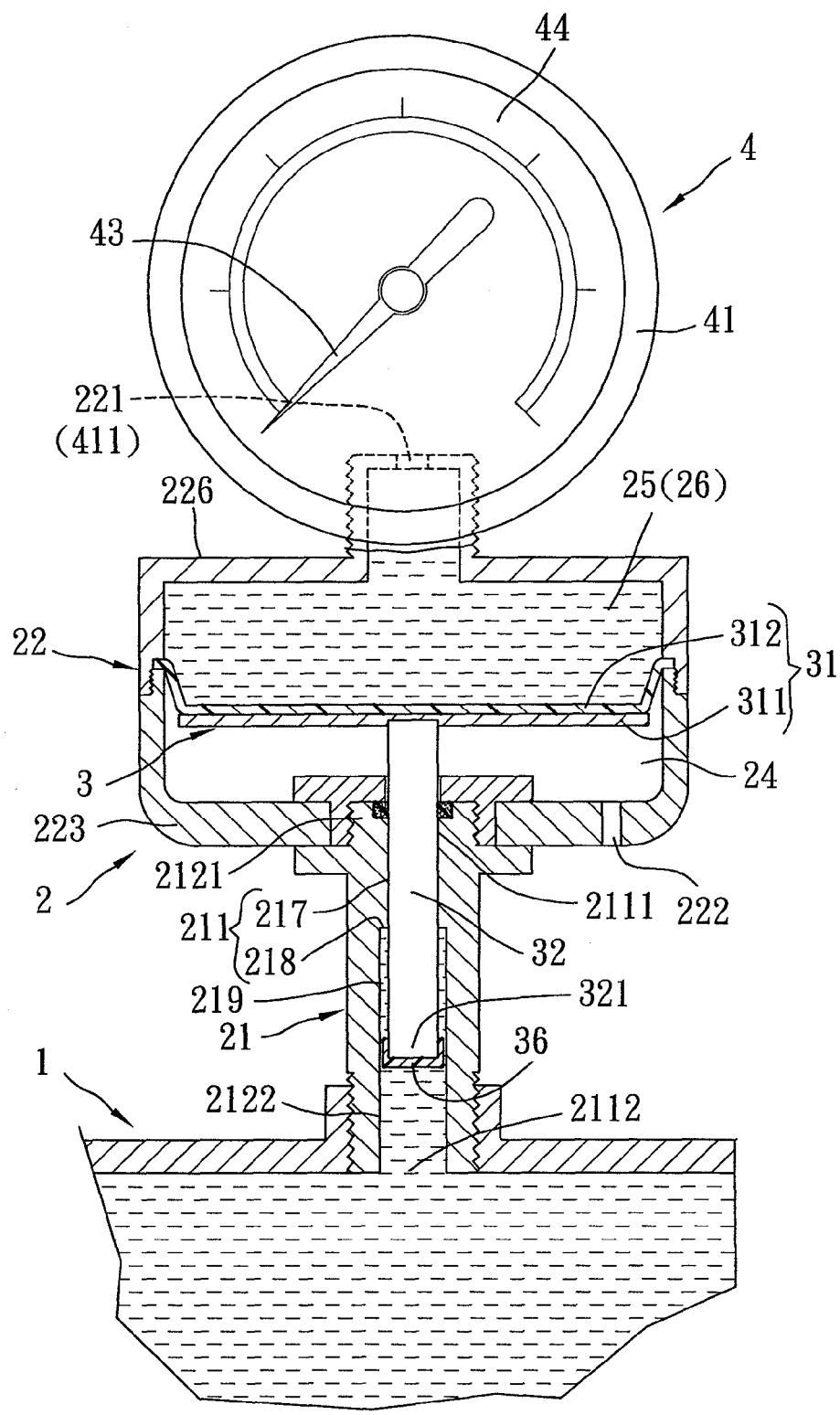
FIG. 6 is a sectional view of the fourth preferred embodiment of a manometer according to this invention.

Referring to FIG. 6, the fourth embodiment of the manometer according to this invention is similar to the first embodiment, except that the tubular chamber 211 has smaller-diameter and larger-diameter subchambers 217, 219 which are respectively disposed proximate to and distal from the cylinder-side threaded end 2121 so as to form a shoulder barrier 218 therebetween. Further, the piston rod 32 has an abutment flange portion 36 which is disposed on the pressed end 321 and which is engageable with the shoulder barrier 218 so as to guard against an excess movement of the piston rod 32 out of the cylinder-side hole 2111 when an extremely high internal pressure is exerted on the pressed end 321. When the manometer of this embodiment is used to measure a relatively high pressure source 1, an extremely large pressure exerting on the pressed end 321 will cause a swift movement of the piston rod 32. By virtue of the abutment of the abutment flange portion 36 against the shoulder barrier 218, undesired removal of the piston rod 32 from the larger-diameter subchamber 219 is prevented.

As illustrated, the manometer according to this invention is provided with the pressure transforming device 2 to transform an internal pressure (P2) of a pressure source 1 to be measured into a reduced or augmented fluid pressure (P1) which is more readily detectable by the pressure gauge device 4, thereby enlarging the detecting scope of the pressure gauge device 4 while maintaining the normal function of the pressure gauge device 4.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A manometer for measuring an internal pressure of a pressure source, comprising:
   a pressure gauge having an upfront port;
   an indicator disposed to indicate a measured value that corresponds to a detected fluid pressure measured at said upfront port;
   a cylinder having a cylindrical chamber which extends in a lengthwise direction to terminate at proximate and distal walls, and which has a cross-section of a first area, said proximate and distal walls respectively having an outlet which is disposed in fluid communication with one of said upfront port and the pressure source, and a guiding bore;

a piston configured to be fitted in and fluid-tightly slidable relative to said cylindrical chamber so as to cooperate with said proximate wall to define a fluid subchamber that is in fluid communication with said outlet;

a piston rod which is disposed to extend from said piston in the lengthwise direction and outwardly of said guiding bore and terminating at a pressed end, said piston rod having a cross-section of a second area that is smaller than the first area of said cylindrical chamber; and a tubular coupler configured to define a tubular chamber which extends in the lengthwise direction to terminate at a source-side port that is in fluid communication with the other one of said upfront port and the pressure source, and a cylinder-side hole which is in alignment with said guiding bore to permit said pressed end to be fluid-tightly guided into said tubular chamber, a corresponding one of said fluid subchamber and said tubular chamber being disposed to contain a working fluid such that the internal pressure of the pressure source exerting on a corresponding one of said pressed end and said piston is transmitted to said working fluid through said piston.

2. The manometer as claimed in claim 1, further comprising a seal ring disposed in said cylinder-side hole and sleeved on said piston rod to ensure a fluid-tight engagement between said piston rod and said cylinder-side hole.

3. The manometer as claimed in claim 1, wherein said tubular coupler includes a tubular wall which extends in the lengthwise direction to terminate at a cylinder-side threaded end and a source-side threaded end, and which defines said tubular chamber therein, a surrounding flange which extends radially from said tubular wall and adjacent to said cylinder-side threaded end, and a tightening nut member having a nut body which is configured to be fitted in said guiding bore and threadedly engageable with said cylinder-side threaded end, and an enlarged head which has a through hole that is disposed in alignment with said tubular chamber so as to permit said piston rod to pass therethrough, and which is configured such that, once said nut body is in full threaded engagement with said cylinder-side threaded end, said enlarged head is brought toward said surrounding flange so as to sandwich and tighten said distal wall therebetween.

4. The manometer as claimed in claim 3, wherein said tubular chamber has smaller-diameter and larger-diameter subchambers which are disposed proximate to and distal from said cylinder-side threaded end so as to form a shoulder barrier therebetween, said piston rod having an abutment flange portion which is disposed on said pressed end and which is engageable with said shoulder barrier so as to guard against an excess movement of said piston rod out of said cylinder-side hole when an extremely high internal pressure is exerted on said pressed end.

5. The manometer as claimed in claim 1, wherein said cylindrical chamber has an air subchamber defined between said piston and said distal wall and having a vent hole to communicate said air subchamber with ambient air.

6. A pressure transforming device for a manometer to measuring an internal pressure of a pressure source, the manometer including a pressure gauge having an upfront port, and an indicator disposed to indicate a measured value that corresponds to a detected fluid pressure measured at the upfront port, said pressure transforming device comprising:

a cylinder having a cylindrical chamber which extends in a lengthwise direction to terminate at proximate and distal walls, and which has a cross-section of a first area, said proximate and distal walls respectively having an outlet which is disposed in fluid communication with one of the upfront port and the pressure source, and a guiding bore;

a piston configured to be fitted in and fluid-tightly slidable relative to said cylindrical chamber so as to cooperate with said proximate wall to define a fluid subchamber that is in fluid communication with said outlet;

a piston rod which is disposed to extend from said piston in the lengthwise direction and outwardly of said guiding bore and terminating at a pressed end, said piston rod having a cross-section of a second area that is smaller than the first area of said cylindrical chamber; and a tubular coupler configured to define a tubular chamber which extends in the lengthwise direction to terminate at a source-side port that is in fluid communication with the other one of the upfront port and the pressure source, and a cylinder-side hole which is in alignment with said guiding bore to permit said pressed end to be fluid-tightly guided into said tubular chamber, a corresponding one of said fluid subchamber and said tubular chamber being disposed to contain a working fluid such that the internal pressure of the pressure source exerting on a corresponding one of said pressed end and said piston is transmitted to said working fluid through said piston.

* * * * *